(12) United States Patent
Daly et al.

(10) Patent No.: US 11,676,134 B2
(45) Date of Patent: Jun. 13, 2023

(54) TRANSACTION INTERACTION ANALYSIS AND SUMMARIZATION

(71) Applicant: INTERNATIONAL BUSINESS MACHINES CORPORATION, Armonk, NY (US)

(72) Inventors: Elizabeth Daly, Dublin (IE); Léa Deleris, Paris (FR); Martin Stephenson, County Westmeath (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 812 days.

(21) Appl. No.: 16/443,434

(22) Filed: Jun. 17, 2019

(65) Prior Publication Data

US 2020/0394649 A1     Dec. 17, 2020

(51) Int. Cl.
*G06Q 20/38*      (2012.01)
*G06N 20/00*      (2019.01)

(52) U.S. Cl.
CPC ............. *G06Q 20/38* (2013.01); *G06N 20/00* (2019.01)

(58) Field of Classification Search
CPC ................................ G06Q 20/38; G06N 20/00
USPC ..................................................... 705/35, 1.1
See application file for complete search history.

(56) References Cited

U.S. PATENT DOCUMENTS

| | | | |
|---|---|---|---|
| 10,977,258 B1* | 4/2021 | Liu | G06F 40/274 |
| 2009/0326998 A1* | 12/2009 | Watkins | G06Q 40/08 705/38 |
| 2011/0238550 A1* | 9/2011 | Reich | G06Q 40/00 705/35 |
| 2012/0109802 A1* | 5/2012 | Griffin | G06Q 40/08 705/35 |
| 2013/0030993 A1* | 1/2013 | Peace | G06Q 20/4016 705/39 |
| 2014/0236663 A1 | 8/2014 | Smith et al. | |
| 2015/0066739 A1* | 3/2015 | Lucas, Jr. | G06Q 40/025 705/38 |
| 2015/0363783 A1* | 12/2015 | Ronca | G06Q 20/382 705/71 |
| 2016/0316059 A1 | 10/2016 | Nuta et al. | |
| 2017/0011404 A1* | 1/2017 | Clower | G06Q 40/02 |
| 2017/0187880 A1 | 6/2017 | Raanani et al. | |
| 2017/0228777 A1* | 8/2017 | Fischer | G06Q 30/0269 |
| 2018/0225608 A9 | 8/2018 | Smith et al. | |
| 2018/0350006 A1* | 12/2018 | Agrawal | G06F 7/026 |

* cited by examiner

*Primary Examiner* — William E Rankins
(74) *Attorney, Agent, or Firm* — Griffiths & Seaton PLLC

(57) ABSTRACT

Embodiments for entity transaction interaction analysis and summarization by a processor. Transaction elements relating to one or more entity transaction interactions may be identifies and extracted from one or more communications. The transaction elements may be combined with one or more transaction opportunities and transaction historical data to provide a transaction summary.

17 Claims, 7 Drawing Sheets

TRANSACTION INTERACTION ANALYSIS AND SUMMARIZATION

BACKGROUND OF THE INVENTION

Field of the Invention

The present invention relates in general to computing systems, and more particularly to, various embodiments for transaction interaction analysis and summarization by a processor.

Description of the Related Art

In today's society, consumers, businesspersons, educators, and others communicate over a wide variety of mediums in real time, across great distances, and many times without boundaries or borders. The advent of computers and networking technologies has made possible the intercommunication of people from one side of the world to the other. These computing systems allow for the sharing of information between users in an increasingly user friendly and simple manner. The increasing complexity of society, coupled with the evolution of technology, continues to engender the sharing of a vast amount of information between people.

SUMMARY OF THE INVENTION

Various embodiments for transaction interaction analysis and summarization by a processor, are provided. In one embodiment, by way of example only, a method for providing entity transaction interaction analysis and summarization, again by a processor, is provided. One or more transaction elements may be identified and extracted relating to one or more entity transaction interactions from one or more communications. Transaction elements relating to one or more entity transaction interactions may be identifies and extracted from one or more communications. The transaction elements may be combined with one or more transaction opportunities and transaction historical data to provide a transaction summary.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
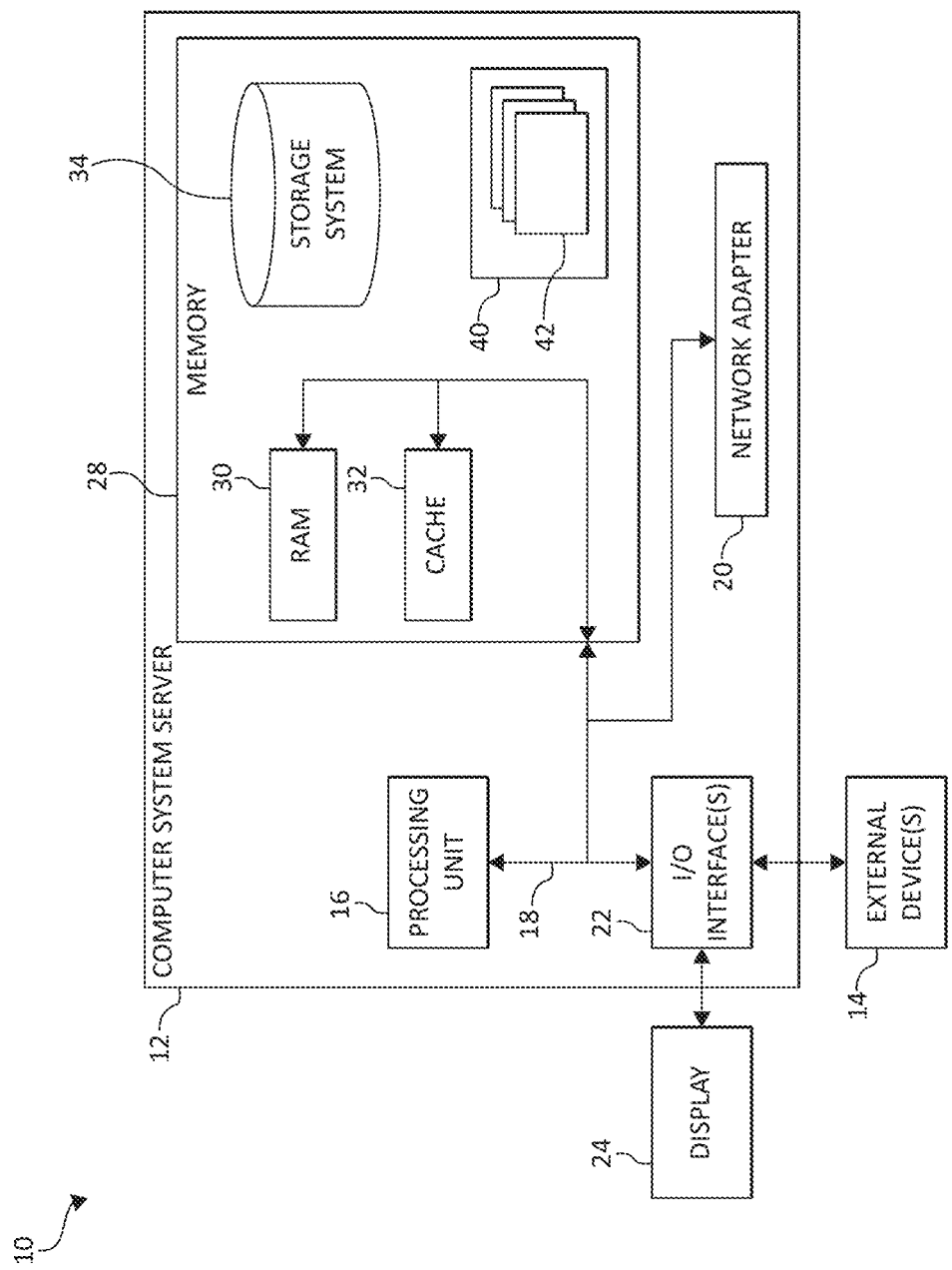
FIG. 1 is a block diagram depicting an exemplary cloud computing node according to an embodiment of the present invention.

The advent of real-time communication made possible by various computing devices enables people to share communication, such as emails, messages, speeches, social media posts, and other content. More specifically, as consumers, businesspersons, educators, and others have become more accessible and globalized, using various computing systems such as, for example, audio and/or video conferencing systems for meetings, conferences, or presentations. Often times, these meetings, conferences, or presentations include topics and subtopics involving participants (e.g., sellers, clients, customers, etc.) to engage in discussions when conducting a presentation (e.g., a sales proposal) for proposing to enter into a transaction (e.g., a business transaction, sales agreement, etc.) or creating a transaction relationship (e.g., vendor-client relationship) and/or transactional opportunity (e.g., a business opportunity). The transactional opportunity may be a "transactional operation" such as, for example, a sales opportunity or vendor-client relationship. Much of the time a potential customer/client may not fully decide on the transaction (e.g., sale) over the course of a single interaction, but, rather, may consider other transactional opportunities, one or more required actions for a potential entity (e.g., vendor/seller), and potentially return at a subsequent period of time only to reject or decline entering into a transactional relationship (e.g., vendor-client relationship).

Accordingly, various embodiments are provided herein for providing entity transaction interaction analysis and summarization, again by a processor, is provided. One or more transaction elements may be identified and extracted relating to one or more entity transaction interactions from one or more communications (e.g., audio data, video data, etc.). The transaction elements may be combined with one or more transaction opportunities, transaction criteria, transaction objections, and historical data to provide a summary of the transaction elements, alternative entity transaction opportunities, required transaction elements for a future communication, or a combination thereof. In one aspect, the communications (e.g., conversations) and the contexts of the communications may be tracked from multiple resources or data sources (e.g., video data, audio data, social media posts, video/audio threads, channels, protocols, email, short mail service ("SMS") messages, voice data/messages, and the like) on different applications and/or devices.

In one aspect, data such as, for example, communications, from one or more computing devices, having text data (e.g., transcripts of discussions, emails, blogs, social media posts,) or audio and/or video recordings (with possible timestamps) may be received and gathered. The communications (e.g., text data, audio data, visual data) may be processed so as to 1) automatically transcribe speech data (for audio data) and/or process video data, 2) identify speakers/participants for each specific audio utterance of the data, 3) identify segments within the data pertaining to transactional discussions (e.g., sales discussion) along with the transaction topic, 4) automatically extract mentions of transactional elements, for example criteria, alternatives, tradeoffs, constraints, etc., 5) group, cluster, and/or organize extracted information (including mapping decision alternatives and criteria of each transaction), 6) enrich concepts of the transactions/communications by linking the transactions/communications to a domain knowledge (e.g., dbpedia), and/or 7) identify expressed sentiment by one or more participants towards raised transactional elements in the communication (e.g., during a meeting, presentation, sales call, etc.). In other words, the present invention may digest and process the audio data, video data, and/or text data for extracting one or more decision elements that may be grouped, coordinated, and organized for later processing.

The mechanisms of the illustrated embodiments may provide a structured summary of one or more transaction elements of the communications so as to enable a user, participant, or other third party to interact with the structured summary. The structured summary may be displayed on an interactive graphical user interface ("GUI") as a visual representation of the transaction summary. The visual representation of the summary may a) enable users to filter on keywords, authors/contributors, dates, and/or other selected aspects, b) scrutinize each piece of extracted information in context so as to determine (either automatically performed and/or via a user) as to whether the extracted information was correctly identified or not or simply to help the user understand the meaning, etc., and/or c) 8) identify expressed sentiment by one or more participants towards the transaction elements, for instance alternatives and/or criteria. Other examples of various aspects of the illustrated embodiments, and corresponding benefits, will be described further herein.

In one aspect, the GUI may be provided so as to enable a user to interact with a summary table, containing the summary of the decision elements, to visualize extracted information under different formats enriched with links to external knowledge to support one or more decisions in the summary table. Each atomic piece of extracted information associated with each extracted element may be scrutinized, analyzed, edited, corrected, confirmed, and/or rejected. The extracted information may be filtered by date, time, and/or authors for selected use cases (or to provide users to focus on a subset of the speakers). A consensus and/or dissention may be identified from the extracted information relating to alternatives and/or criteria. One or more suggestions or recommendations relating to one or more decisions, consensus, and/or dissension may be provided. In one aspect, the suggestions and/or recommendations may be ranked according to identified criteria.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
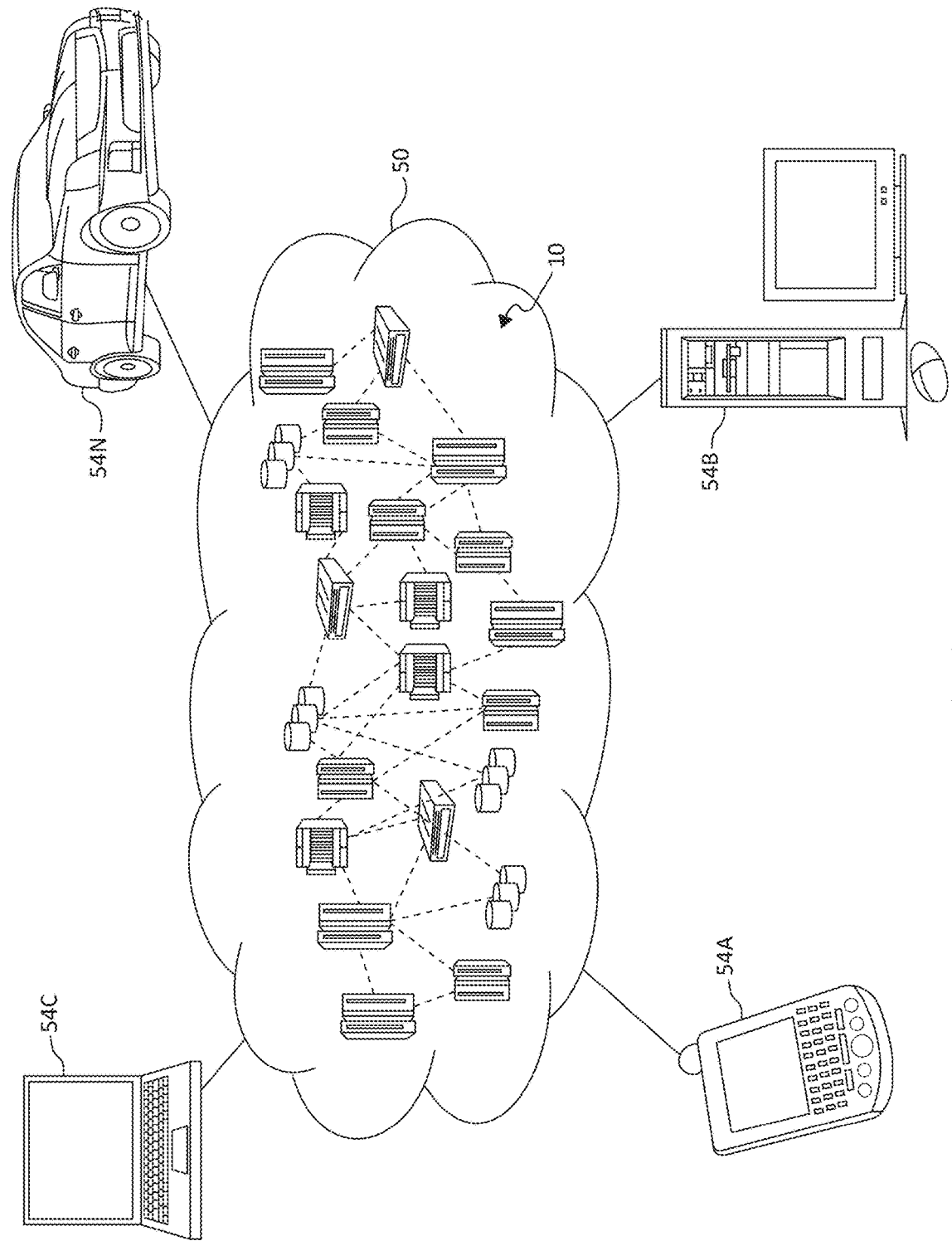
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
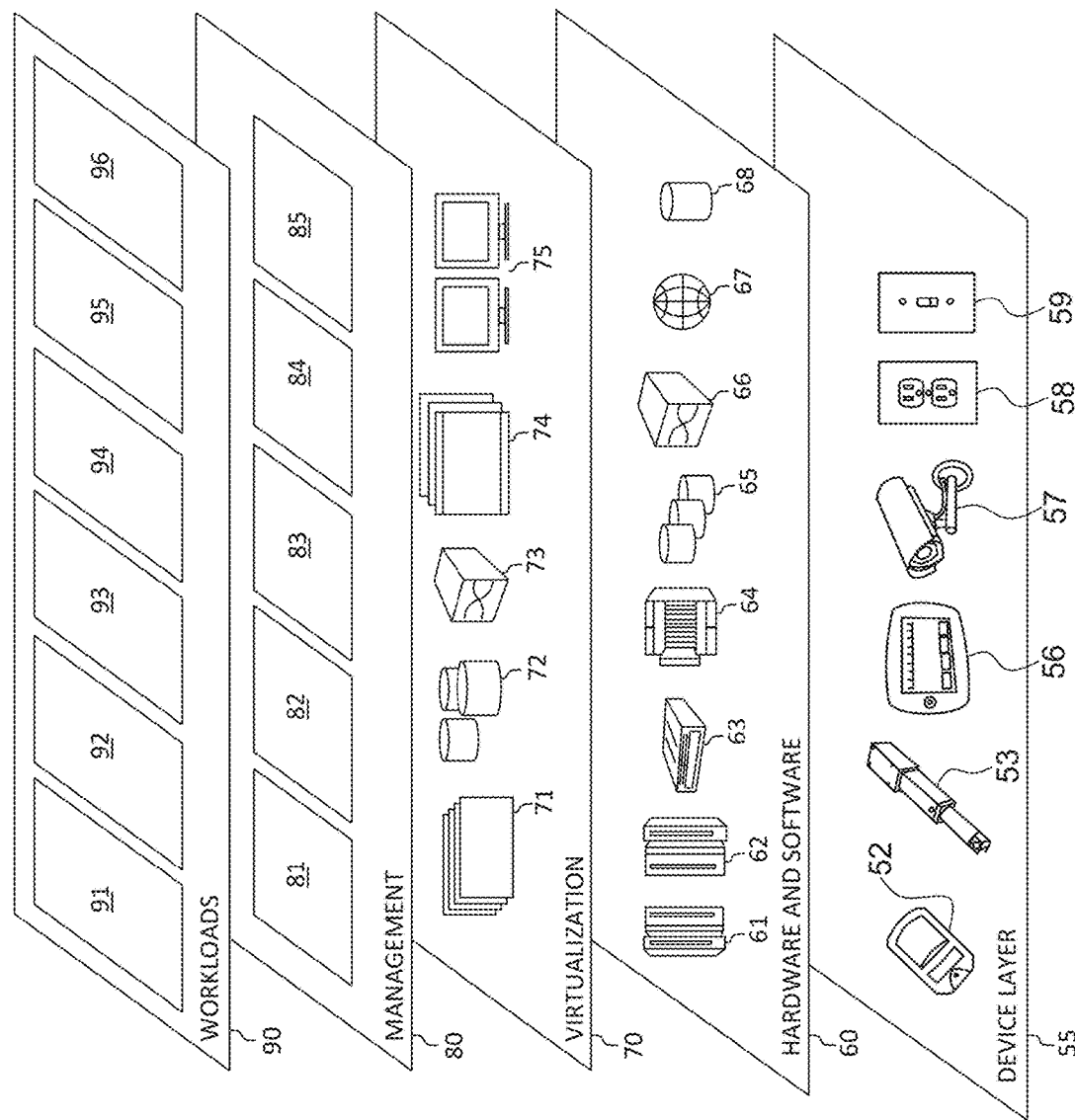
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various extraction and summarization of decision workloads and functions 96. In addition, extraction and summarization of decision workloads and functions 96 may include such operations as data analytics, data analysis, and as will be further described, notification functionality. One of ordinary skill in the art will appreciate that the extraction and summarization of decision workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide novel approaches for providing transaction interaction analysis and summarization, again by a processor, is provided. One or more transaction elements may be identified and extracted relating to one or more entity transaction interactions from one or more communications (e.g., audio data, video data, etc.). The transaction elements may be combined with one or more transaction opportunities and transaction historical data to provide a transaction summary. In an additional aspect, the transaction elements may be combined with transaction opportunities and historical data to provide a summary of the transaction elements, alternative entity transaction opportunities, required transaction elements for a future communication, or a combination thereof.

In aspect, the present invention provides for analysis of a communication and identifies each of the following. 1) A transaction goal or requirement such as, for example, "I am looking for a customer analytics solution." 2) Each criteria of importance or requirement of an entity such as, for example, "our company is looking for a hosted solution." 3) One or more alternatives proposed: "we offer two products that might suite your business needs." These outputs can then be leveraged to create a quick, review summary for a potential vendor/seller the next time the potential client communicates a message. An artificial intelligence "AI" solutions of the present invention can further consume these outputs in order to: 1) learn what alternatives clients discuss before purchasing a product or service, 2) learn what criteria is most important to various customer profiles when deciding between products, goods, and/or services, 3) identify competitors and the reasons clients are considering them, 4) learn which arguments from the vendor/seller for a given product positively influence a transaction (e.g., a sale), and 5) learn what criteria most negatively impacts a sale.

Figure 4:
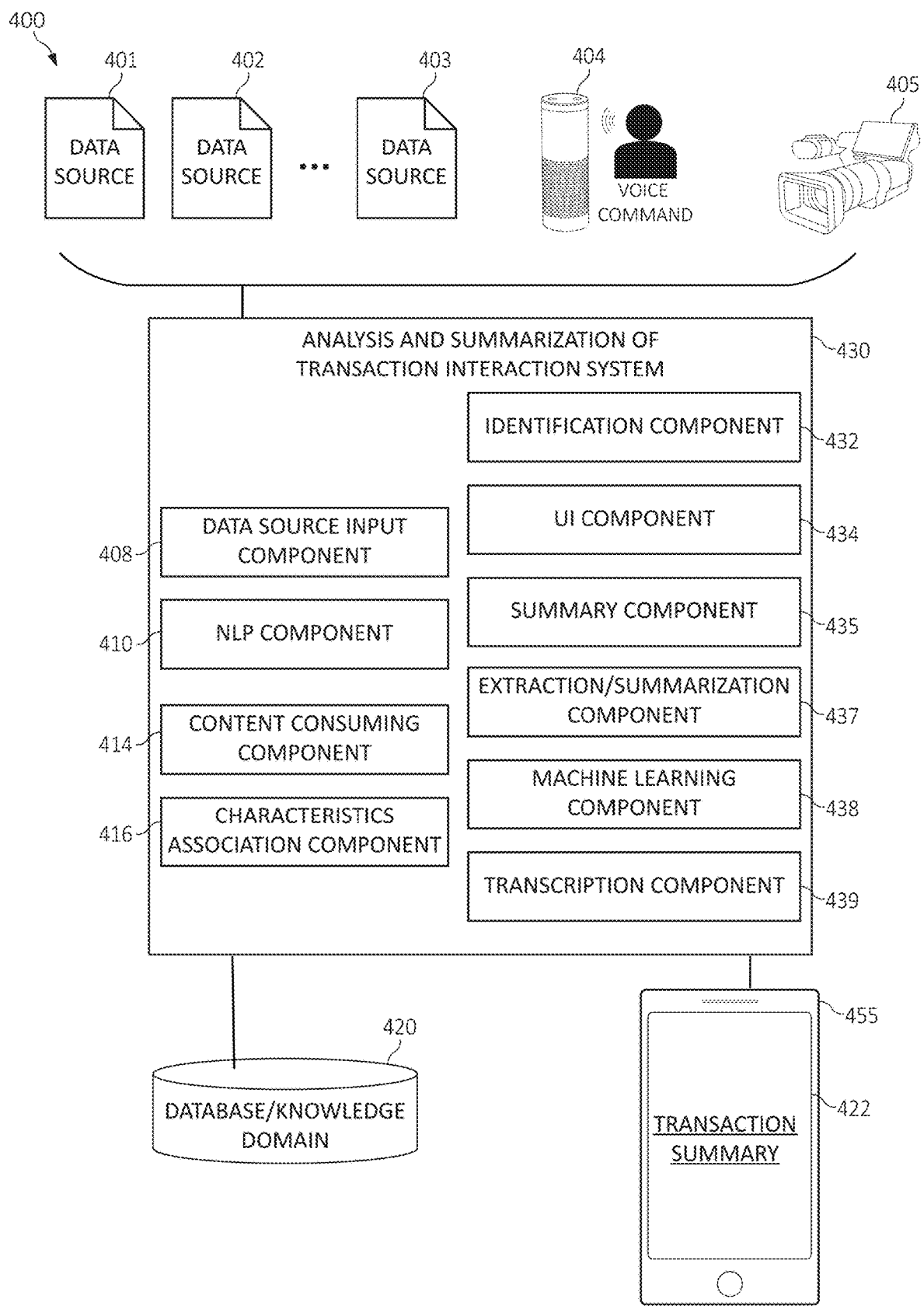
FIG. 4 is a diagram depicting various user hardware and computing components functioning in accordance with aspects of the present invention.

Turning now to FIG. 4, a block diagram of exemplary functionality 400 relating to transaction interaction analysis and summarization is depicted. As shown, the various blocks of functionality are depicted with arrows designating the blocks' 400 relationships with each other and to show process flow. Additionally, descriptive information is also seen relating each of the functional blocks 400. With the foregoing in mind, the module blocks 400 may also be incorporated into various hardware and software components of a system for transaction interaction analysis and summarization methods and features in accordance with the present invention, such as those described in FIGS. 1-3. Many of the functional blocks 400 may execute as background processes on various components, either in distributed computing components, or on the user device, or elsewhere.

Multiple data sources 401-405 may be provided by one or more content contributors. The data sources 401-405 may be provided as a corpus or group of data sources defined and/or identified. The data sources 401-405 may include, but are not limited to, data sources relating to one or more documents, materials related to emails, books, scientific papers, online journals, journals, articles, drafts, audio data, video data, and/or other various documents or data sources capable of being published, displayed, interpreted, transcribed, or reduced to text data. The data sources 401-405 may be all of the same type, for example, pages or articles in a wiki or pages of a blog. Alternatively, the data sources 401-405 may be of different types, such as word documents, wikis, web pages, power points, printable document format, or any document capable of being analyzed by a natural language processing system.

In addition to text based documents, other data sources such as audio, video or image sources may also be used wherein the audio, video or image sources may be pre-analyzed to extract or transcribe their content for natural language processing, such as converting from audio to text and/or image analysis. For example, a voice command issued by a content contributor may be detected by a voice-activated detection device 404 and record each voice command or communication. The recorded voice command/communication may then be transcribed into text data for natural language processing. As an additional example, a video capturing device 405 (e.g., a camera) may record a video such as, for example, a webinar or meeting where cameras are installed in a room for broadcasting the meeting to remote locations where various intellectual property content contributors may collaborate remotely. The video data captured by the video capturing device 405 may be analyzed and transcribed into images or text data for natural language processing.

A data source input component 408 may consume and/or receive the group of data sources 401-405 for an extraction and summarization of decisions system such as, for example, analysis and summarization of transaction interaction system 430 using natural language processing (NLP) and artificial intelligence (AI) to provide processed content.

The data sources 401-405 may be analyzed by an NLP component 410 (and a transcription component 439 if necessary) to data mine or transcribe relevant information from the content of the data sources 401-405 (e.g., documents, emails, reports, notes, audio records, video recordings, live-streaming communications, etc.) in order to display the information in a more usable manner and/or provide the information in a more searchable manner. The NLP component 410 may be provided as a cloud service or as a local service.

The analysis and summarization of transaction interaction system 430 may include the NLP component 410, a content consuming component 414, a characteristics association and component 416. The NLP component 410 may be associated with the content consuming component 414. The content consuming component 414, in association with the data source input component 408, may be used for inputting the data sources 401-405 and running NLP and AI tools against them, learning the content, such as by using the machine learning component 438. It should be noted that other components of FIG. 4 may also employ one or more NLP systems and the NLP component 410 is merely illustrated by way of example only of use of an NLP system. As the NLP component 410 (including the machine learning component 438) learns different sets of data, the characteristics association component 416 (or "cognitive characteristics association component") may use the artificial intelligence to make cognitive associations or links between data sources 401-405 by determining common concepts, methods, features, similar characteristics, and/or an underlying common topic.

Intelligence (e.g., "cognition") is the mental process of knowing, including aspects such as awareness, perception, reasoning and judgment. An AI system uses artificial reasoning to interpret the data sources 401-405 and extract their topics, ideas, or concepts. The learned decisions, decision elements, alternatives to the decision, alternative options/choices, decision criteria, concepts, suggestions, topics and subtopics of a domain of interest, may not be specifically named or mentioned in the data sources 401-405 and is derived or inferred by the AI interpretation.

The learned content of the data sources consumed by the NLP system may be merged into a database 420 (and/or knowledge store) or other data storage method of the consumed content with learned concepts, methods, and/or features of the data sources 401-405 providing association between the content referenced to the original data sources 401-405.

The database 420 may also work in conjunction with the transcription component 439 to maintain a timestamped record of all interactions and contributions of each content contributor, decision, alternative, criteria, subject, topic, or idea. The database 420 may record and maintain the evolution of decisions, alternatives, criteria, subjects, topics, ideas, or content discussed in the data sources 401-405.

The database 420 may track, identify, and associate all communication threads, messages, transcripts, and the like of all data generated during all stages of the development or "life cycle" of the decisions, decision elements, alternatives, choices, criteria, subjects, topics, or ideas. The merging of the data into one database 420 (which may include a domain knowledge) allows the analysis and summarization of transaction interaction system 430 to act like a search engine, but instead of keyword searches, it will use an AI method of making cognitive associations between the data sources using the deduced concepts.

The analysis and summarization of transaction interaction system 430 may include a user interface ("UI") component 434 (e.g., an interactive graphical user interface "GUI") providing user interaction with the indexed content for mining and navigation and/or receiving one or more inputs/queries from a user. More specifically, the user interface component 434 may be in communication with a wireless communication device 455 (see also the PDA or cellular telephone 54A, the desktop computer 54B, the laptop computer 54C, and/or the automobile computer system 54N of FIG. 2.) for also providing user input for inputting data such as, for example, data sources 401-405 and also providing user interaction with a summary of the decision elements, alternatives, and/or criteria. The wireless communication device 455 may use the UI component 434 (e.g., GUI) for providing input of data and/or providing a query functionality such as, for example, interactive GUI functionality for enabling a user to enter a query in the GUI 422 relating to a domain of interest, topic, decision, alternative, criteria, summary of decisions, and/or an associated objective. For example, GUI 422 may display a decision summary (e.g., a summary of the decision elements, alternatives, and/or criteria).

The analysis and summarization of transaction interaction system 430 may also include an identification component 432. The identification component 432 may use data retrieved directly from one or more data sources or stored in the database 420 (or multiple immutable ledgers). The identification component 432 may identify and extract (using the extraction/summarization component 437) one or more transaction elements relating to one or more entity transaction interactions from one or more communications, identify the transaction elements, the alternative entity transaction opportunities, the required transaction elements that pertain to the transaction elements, and/or identify a consensus or dissension to the transaction elements by one or more users involved in the one or more communications.

The identification component 432 may include using a processing (pre-processing and/or post-processing) analytics component 450, to assist with identifying a consensus or dissension to the one or more transaction by one or more users involved in the communications. The processing analytics component 450 may also be used to assist the identification component 432 with and/or to provide one or more recommendations or suggestions (via the UI component) to follow relating to the one or more transactions. The post-processing analytics component 450 may also be used to assist and/or provide one or more alternative suggestions relating to the one or more transactions, consensus, and/or dissension.

The analysis and summarization of transaction interaction system 430 may also include a summary component 435 and the extraction/summarization component 437 for grouping, clustering, and/or organizing the plurality of transaction elements according to similar transactions. The summary component 435 may group, cluster, and/or organize transaction elements, transactions, alternative decisions/choices, and/or transaction criteria together based on the context, similar sentiments, similar concepts, and/or timestamp of the communications (e.g., audio/video data and/or text data having a timestamp indicating the communication occurs during the same time such as, for example, video data, audio data, notes, and/or text data of a meeting occurring at a selected time). The summary component 435 and the extraction/summarization component 437 may track the various interactions between various entities (e.g., vendor-client/customer) such as, for example, each communication and interaction involved in a transaction, an evolution of ideas, topics/subtopics, transactions, transaction elements, alternatives, criteria and/or content that may be discussed in the documents or records of the database 420 (e.g., from the start of a sales presentation meeting until the end of the sale presentation meeting).

The summary component 435 and the extraction/summarization component 437 may combine the transaction elements with one or more transaction opportunities, transaction criteria, transaction objections, and historical data to provide a summary of the transaction elements, alternative entity transaction opportunities, required transaction elements for a future communication, or a combination thereof.

The summary component 435 and the extraction/summarization component 437 may link together each of the transaction elements with identified sources of the transaction element. That is, the extraction/summarization component 437 may link transaction, transaction elements, alternative decisions, alternative suggestions, alternative choices, criteria, and/or summary of the plurality of the transaction elements to a domain knowledge, which may be included in the database 420 and/or associated with the database 420. The extraction/summarization component 437 may enhance the transactions, transaction elements, alternative transaction, alternative suggestions, alternative choices, criteria, and/or summary using the domain knowledge.

The summary component 435 and the extraction/summarization component 437 may recommend one or more of the transaction opportunities according to a ranking of criteria of the transaction criteria, the transaction objections, the historical data, or a combination thereof, and/or recommend one or more actions items required for execution to obtain one or more of the transaction opportunities.

In one aspect, once the NLP component 410 has carried out the linking of the data, the identification component 432 may mine the associated concepts, topics, or similar characteristics from the database 420 of the consumed content to assign a degree of ownership to each content contributor or participants in a discussion/communication (e.g., a sales representative from client "X" and/or vendor "Y"). This can be helpful to identify users/persons who provide useful transaction elements such as, for example, alternatives or relevant criteria, it can also be used for instance for various types of data.

A transcription component 439 may also be included in the analysis and summarization of transaction interaction system 430. For example, the transcription component 439 may be used to transcribe audio data or image/video data from one or more of the data sources 401-405. For example, a voice command/communication captured by the voice-activated detection device 404 (e.g., "voice command") may be transcribed by the transcription component 439 into text data for natural language processing. As an additional example, the video data captured by the video capturing device 405 may be analyzed and transcribed by the transcription component 439 into text data for natural language processing.

The analysis and summarization of transaction interaction system 430 may also include a machine learning component 438. The machine learning component 438 may perform an analysis on the transaction elements, transaction opportunities, transaction criteria, transaction objections, and historical data. The machine learning component 438 may learn one or more alternative entity transaction opportunities, a required transaction elements to be including in a future communication for securing a subsequent transaction opportunity, or a combination there and/or learn a plurality of decisions relating to correcting each communication message relating to the transaction elements. The machine learning component 438 may recommend a series of corrective actions to de-escalate a possible negative impact or increase a possible positive impact of one or more communications, behavior, actions or events for securing the subsequent transaction opportunity.

The machine learning component 438 may apply one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural networks, Bayesian statistics, naive Bayes classifier, Bayesian network, case-based reasoning, decision trees, inductive logic programming, Gaussian process regression, gene expression programming, group method of data handling (GMIDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

In one aspect, the domain knowledge may be an ontology of concepts representing a domain of knowledge. A thesaurus or ontology may be used as the domain knowledge and may also be used to identify semantic relationships between observed and/or unobserved variables. In one aspect, the term "domain" is a term intended to have its ordinary meaning. In addition, the term "domain" may include an area of expertise for a system or a collection of material, information, content and/or other resources related to a particular subject or subjects. A domain can refer to information related to any particular subject matter or a combination of selected subjects.

The term ontology is also a term intended to have its ordinary meaning. In one aspect, the term ontology in its broadest sense may include anything that can be modeled as an ontology, including but not limited to, taxonomies, thesauri, vocabularies, and the like. For example, an ontology may include information or content relevant to a domain of interest or content of a particular class or concept. The ontology can be continuously updated with the information synchronized with the sources, adding information from the sources to the ontology as models, attributes of models, or associations between models within the ontology.

Additionally, the domain knowledge may include one or more external resources such as, for example, links to one or more Internet domains, webpages, and the like. For example, text data may be hyperlinked to a webpage that may describe, explain, or provide additional information relating to the text data. Thus, a summary may be enhanced via links to external resources that further explain, instruct, illustrate, provide context, and/or additional information to support a decision, alternative suggestion, alternative choice, and/or criteria.

In one aspect, the analysis and summarization of transaction interaction system 430 may perform one or more various types of calculations or computations. The calculation or computation operations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.). It should be noted that each of the components of the analysis and summarization of transaction interaction system 430 may be individual components and/or separate components of the analysis and summarization of transaction interaction system 430.

Figure 5:
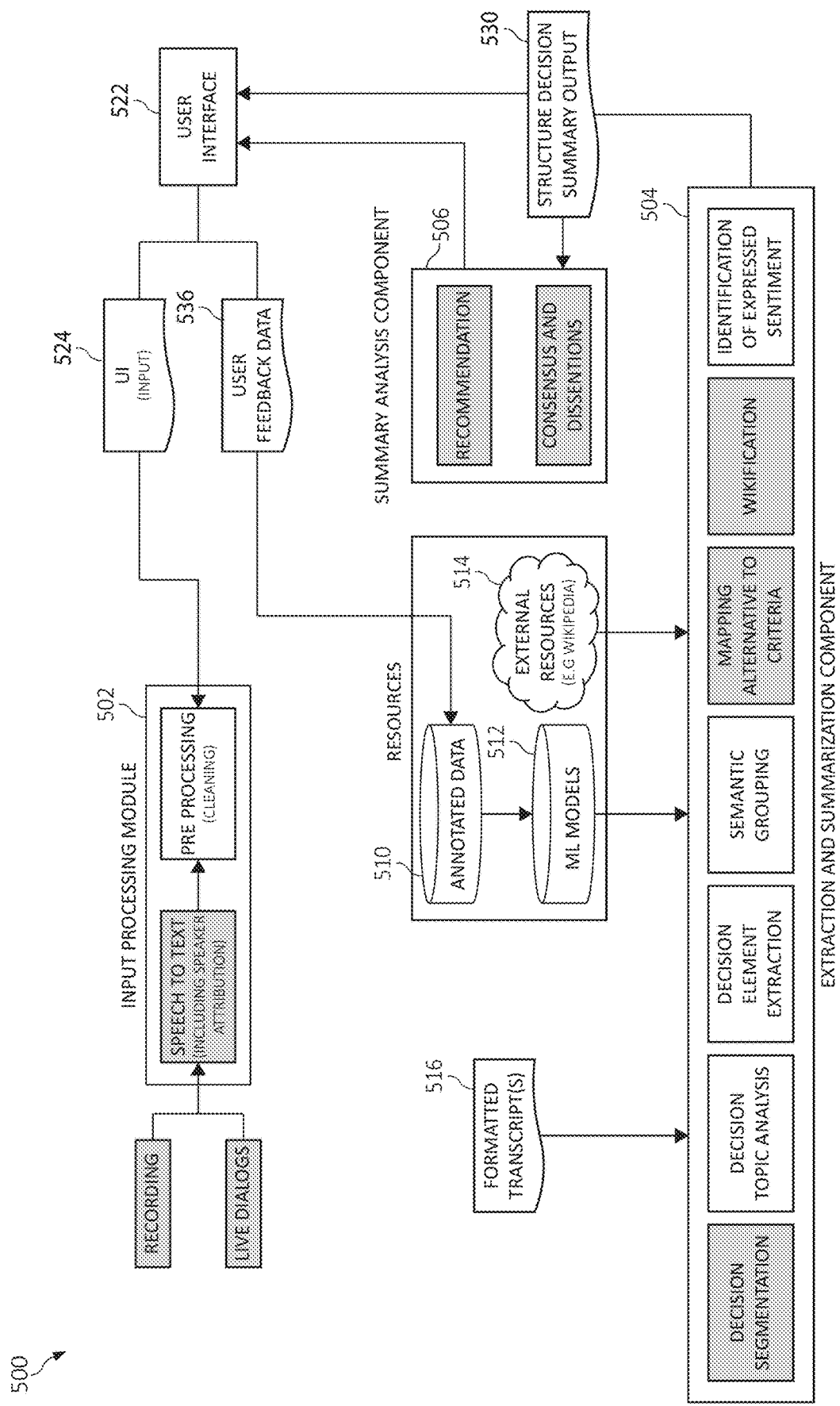
FIG. 5 is an additional diagram depicting various user hardware and computing components functioning in accordance with aspects of the present invention.

In view of the method 400 of FIG. 4, FIG. 5 depicts additional system architecture of an analysis and summarization of transaction interaction system. The analysis and summarization of transaction interaction system may include leveraging or "decoding" (e.g., aka decision gisting) the by applying to a transaction (e.g., sales) domain and using the outputs to gain further insights into the relationship between products, transaction (e.g., sales) presentations, criteria and alternatives. That is, "decision gisting" may be the process/operations of determining a "gist" of a conversation such as, for example, determining the substance or essences of a conversation and, from which, decision elements may be extracted.

The extraction and summarization of transaction systems 500 may be implemented in hardware and/or software, such as by the computer/server 12 (FIG. 1), the workloads layer 90 (FIG. 3), and/or the various aspects, functionality, systems, and components described in FIG. 4.

Turning now to FIG. 5, a block diagram of exemplary functionality of the extraction and summarization of transaction systems 500 relating to an extraction and summarization of decisions system is depicted. As shown, the various blocks of functionality are depicted with arrows designating the blocks' (of the extraction and summarization of transaction systems 500) relationships with each other and to show process flow. Additionally, descriptive information is also seen relating each of the functional blocks of the extraction and summarization of transaction systems 500. As will be seen, many of the functional blocks may also be considered "modules" (or "component") of functionality, in the same descriptive sense as has been previously described in FIGS. 1-3. With the foregoing in mind, the module/component blocks of the extraction and summarization of transaction systems 500 may also be incorporated into various hardware and software components of a system for extraction and summarization of decisions in accordance with the present invention, such as those described in FIGS. 1-3. Many of the functional blocks 500 may execute as background processes on various components, either in distributed computing components, or on the user device, or elsewhere.

As a preliminary matter, the extraction and summarization of decisions system 500 may include an extraction and summarization component 504, one or more resources such as, for example, annotated data 510, machine learning ("ML") models 512, and/or external resources 514 (e.g., DBpedia, WordNet, a domain knowledge, the Internet, etc.), an summary analysis component 506, one or more user interfaces 522 ("UI") (e.g., an interactive GUI). It should be noted that each of the components of the extraction and summarization of decisions system 500 may be included in one computer system/server 12 of FIG. 1 and/or included in multiple computer systems/servers such as, for example, in one or more cloud computing nodes 10 of the cloud computing environment 50 of FIG. 2.

In operation, the extraction and summarization of decisions system 500 may perform an input processing operation using an input processing module 502. For example, one or more recordings ("recording") and/or live communication dialogs ("live dialogs") may be processed by converting speech data and/or video data into a transcript (e.g., text document, emails, short message service "SMS", etc.). For example, a "Speech2Text" (or "speech to text") operation may convert audio information to text data, and/or an optical character recognition ("OCR") operation may convert image input to text data. Alternatively, input data 524 from the UI 522 (e.g., "UI text input") may be received as text input. For example, one or more transcripts, audio/video communication, and/or other input data may be processed (e.g., pre-processed for cleaning and later, additional processing) to produce a formatted transcript 516.

Using the formatted transcripts 516, one or more of the resources such as for example, the annotated data 510, the ML (Machine Learning) models 512, the external resources 514, and/or received user feedback 536, the extraction and summarization component 504 may include providing functionality for performing decision segmentation (e.g., the process of separating/breaking a conversation pertaining to a decision into one or more components that lead to that decision such as, for example, the criteria and alternatives), providing functionality for decision topic analysis, extracting decision elements, semantic grouping, mapping alternatives to criteria functionality, enrichment of decisions through external sources (e.g., wikification), and/or identifying of expressed sentiment toward sentiment and/or transaction element functionality.

The extraction and summarization component 504 may provide a structured decision summary (output) 530 (e.g., JavaScript® Object Notification "JSON") to be used by the UI 522 (output) to be visually displayed to one or more UI's 522 via an application programming interface ("API") output. Moreover, the UI 522 (output) may receive user feedback. In one aspect, the UI 522 (output) may be communicated with the annotated data 510, to record feedback from users (e.g., user feedback data 536) and enable to relearn ML models 512 over time based on a broader input set (which lead to increases performance and computing efficiency). Also, the summary analysis component 506 may include one or more recommendations relating to the decision summary 530 while also identifying, receiving from, and/or providing to the UI 522 consensus and/or dissentions relating to the decisions and/or recommendations via the UI 522 (output).

Figure 6:
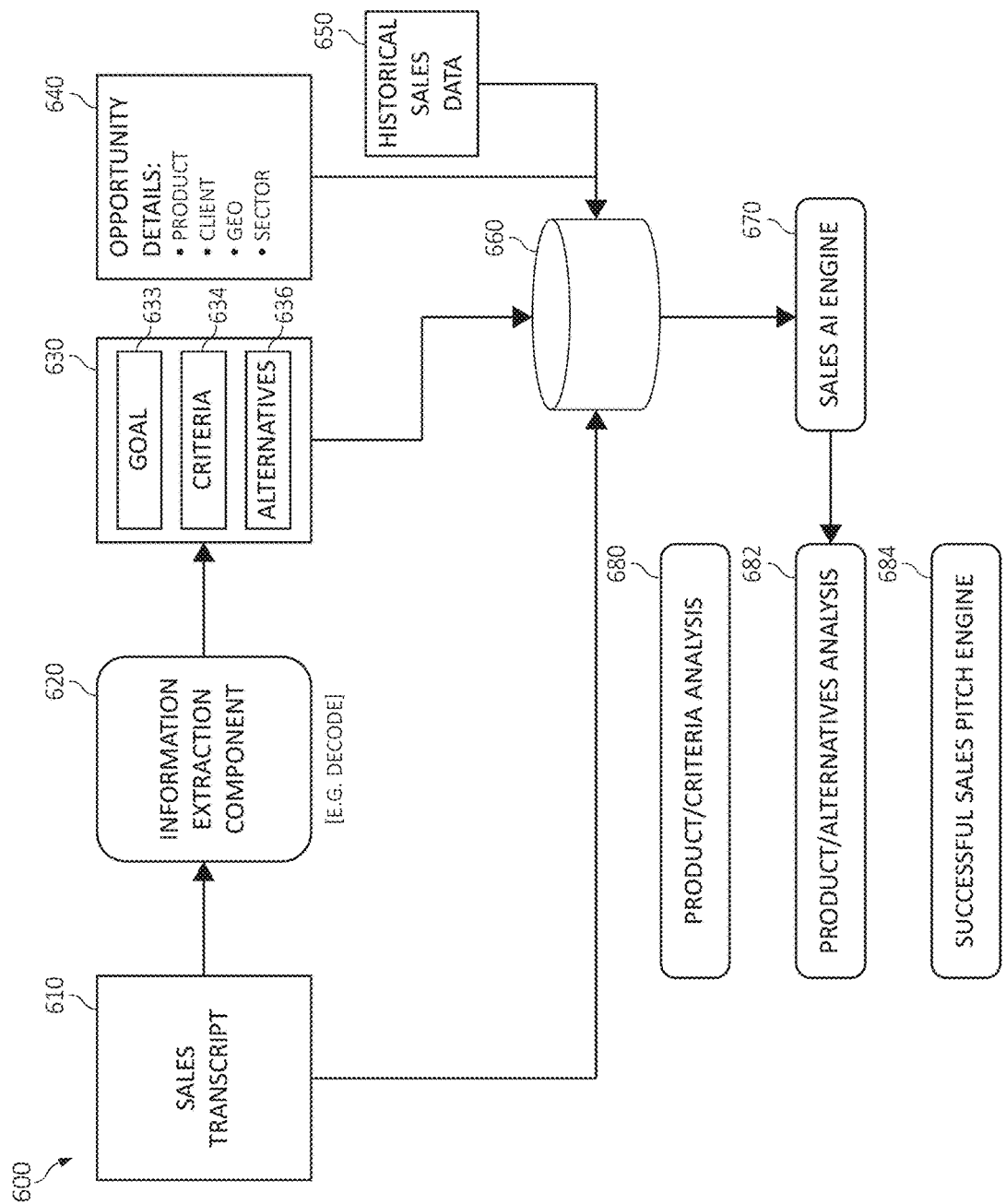
FIG. 6 is a diagram depicting operations for transaction interaction analysis and summarization in accordance with aspects of the present invention.

With the foregoing in mind, FIG. 6 is a block flow diagram 600 of. In one aspect, one or more of the components, modules, services, applications, and/or functions described in FIGS. 1-3 may be used in FIG. 4. Repetitive description of like elements, components, modules, services, applications, and/or functions employed in other embodiments described herein is omitted for sake of brevity.

The operations for transaction interaction analysis and summarization of block flow diagram 600 may be incorporated into various hardware and software components of a system for extraction and summarization of one or more decisions from a communication in accordance with the present invention such as, for example, within computer system/server 12 of FIG. 1.

Also, diagram 600 may be implemented in hardware and/or software, such as by workloads layer 90 (FIG. 3), and/or the analysis and summarization of transaction interaction system 430 of FIG. 4 and/or FIG. 5.

Starting in block 610, a transcript (e.g., transaction/sales interaction transcript) may be received and/or analyzed. Using one or more machine learning operations (e.g., an NLP), information from the transcript may be extracted via an extraction component (e.g., using an "information extraction component" to extract information from the transcript), as in block 620. The extracted information may identify one or more goals (e.g., transaction goals), criteria (e.g., transaction criteria), and/or alternatives (e.g., transaction opportunity alternative), as in block 630. Also, one or more opportunity details may be analyzed such as, for example, types of products/services, clients, geographical ("geo") information, and/or sector information (or other types of data relating to transaction opportunities), as in block 640. Historical transaction/sales data (e.g., output from a previous analysis) may also be identified and analyzed, as in block 650.

The transcript, extracted information, goals, criteria, alternatives, opportunity details, and historical data may be combined and used as input to a database/knowledge domain (e.g., external resources 514 of FIG. 5), as in block 660.

A transaction artificial intelligence ("AI") engine may process the data and outputs a transaction summary and/or transaction insight generation, as in block 670. The transaction summary may provide a product/criteria analysis 680, a product/alternatives analysis 682, and/or successful transaction presentation (sales pitch) engine 640.

The product/criteria analysis 680 may provide an analysis/summary of the products of interest (e.g., products interested in by a user/customer) and the conditions (or criteria) of the user/customer such as, for example "I want a customer relationship tool that records all customer information including their family size and preferred types of holidays." The product/alternatives analysis 682 may provide a summary of the alternatives that may be available to the user/customer and the alternatives that were discussed. The successful sales pitch engine 684 details what transaction/sales conversations resulted in a transaction (e.g., a sale), in addition to the criteria discussed and the alternatives as described herein.

For example, the transaction summary may provide for future retrieval and analysis. The transaction insight generation output may take as input the structured summaries from transaction related communication along with opportunity details and leverage the output in order to be able to provide various insights such as, for example, into insights into competitor entity's products/services, and/or one or more successful transaction presentation criteria (e.g., sales pitch criteria).

To further illustrate, consider the follow examples for application of the various embodiments as described herein. In Example 1, consider a vendor promoting a new product and the vendor engages with a client/customer and presents/pitching a new product and presents the positives of the product. The client responds with alternatives and reasons they are considering these alternatives. The vendor proposes an alternative or highlights positive criteria of the product and the opportunity advances to a successful transaction/sale. A machine learning operation (e.g., a sales AI engine) may utilize he operations of the present invention and learn those arguments from the vendor that had both a positive impact and/or a negative impact (if any) upon the client.

In Example 2, consider a vendor promoting a new product and the vendor leveraging past experiences. The vendor is new to the position and knows of the positives of the product but is uncertain on which criteria tends to have a highest impact on creating a successful transaction/sale. Using the embodiments as described herein, the present invention may provide a summary with the most successful criteria (as compared to the least successful criteria) and which has been covered by vendors in the past on successful deals. This is particularly relevant for a new vendor who have not enhanced a transaction communication/presentation or presenting new products (e.g., goods/services) where understanding those features that relate and resonate the most with clients is unknown.

In Example 3, consider a vendor learning about a competitor. A potential client presents one or more transaction alternatives being consider as proposed by a competitor and one or more reasons why the client is considering them. This information can be used as feedback data into the vendor (e.g., a sales organization) and update a machine learning model and domain knowledge to better understand their competitors and what alternatives, criteria, and/or features that potential clients perceive that are superior by the competitor as compared to the current vendor proposal.

In Example 4, consider an automated "to do" list and summary overview. Consider a vendor that engages a client for purchasing a new product/service and presents one or more positives or superior features of the product/service. The vendor and the client engage in various types of back and forth communications (e.g., emails, meetings, text messages, etc.) discussing the overall goal of the entity and various possible transaction options and alternative products/services. The client is interested in the vendor but requests a piece of information the vendor does not know. The vendor indicates the intention to address the query and follow up with another resource/entity to acquire the requested information. At the end of the communication, the summary output is created and saved along with the action item for the vendor (creating an action item for the vendor). At a selected period of time, the present invention may regenerate a new summary output with the requested information of the action item (which may have learned via machine learning) and an alert/reminder may be triggered and sent to the vendor of the action item reminding the vendor to communicate with the client a complete list, summary, overview of all the products/services along with the requested information along with goals, criteria, and factors/features that are required by the client, which is provided by the summary output (which may be an updated summary output).

Figure 7:
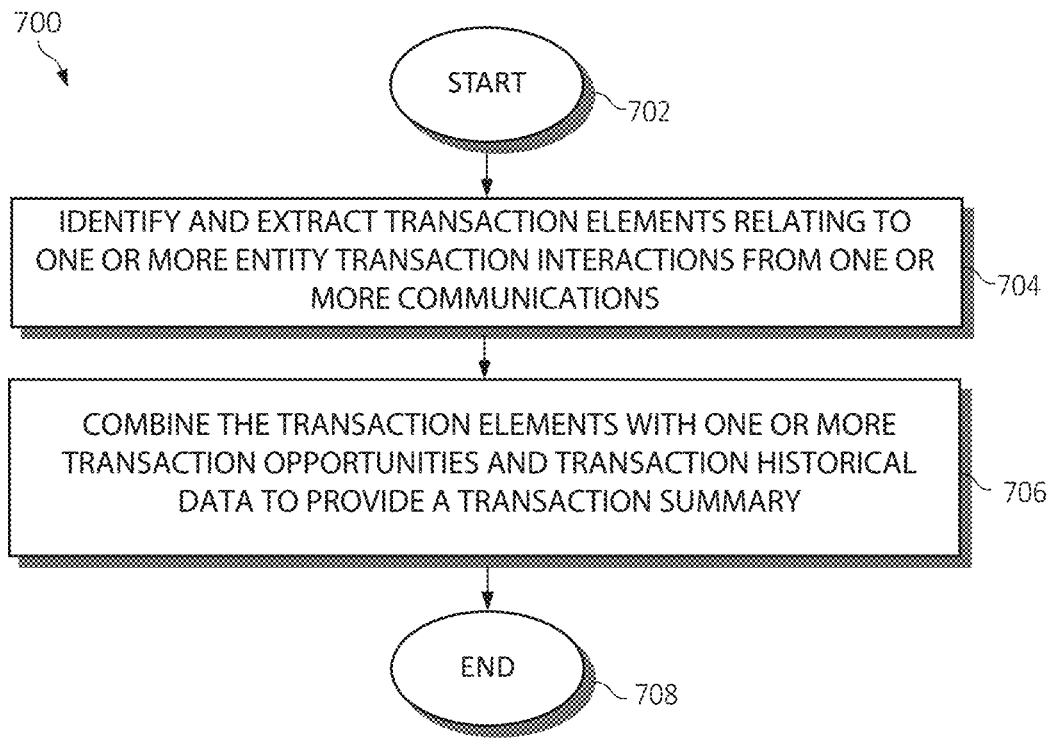
FIG. 7 is an additional flowchart diagram depicting an additional exemplary method for providing transaction interaction analysis and summarization, again in which various aspects of the present invention may be realized.

FIG. 7 is an additional flowchart diagram 700 depicting an additional exemplary method for providing entity transaction interaction analysis and summarization, again in which various aspects of the present invention may be realized. The functionality 700 may be implemented as a method executed as instructions on a machine, where the instructions are included on at least one computer readable medium or one non-transitory machine-readable storage medium. The functionality 700 may start in block 702.

Transaction elements relating to one or more entity transaction interactions may be identifies and extracted from one or more communications, as in block 704. The transaction elements may be combined with one or more transaction opportunities and transaction historical data to provide a transaction summary, as in block 706. The functionality 700 may end, as in block 708.

In one aspect, in conjunction with and/or as part of at least one block of FIG. 7, the operations of method 700 may include each of the following. The operations of method 700 may define the transaction elements as transaction goals, transaction criteria, transaction consensus or dissensions, alternative entity transaction opportunities, identify the transaction elements, the alternative entity transaction opportunities, the required transaction elements that pertain to the transaction elements, link together each of the transaction elements with identified sources of the transaction elements in the one or more communications, and/or identify a consensus or dissension to the transaction elements by one or more users involved in the one or more communications.

The operations of method 700 may recommend one or more of the transaction opportunities (e.g., a potential transaction opportunity) according to a ranking of criteria of the transaction criteria, the transaction objections, the historical data, or a combination thereof, and/or recommend one or more actions items required for execution to obtain one or more of the transaction opportunities.

The operations of method 700 may provide the transaction summary (which may be a summary of the transaction elements) via an interactive graphical user interface (GUI) on one or more Internet of Things (IoT) devices. Additionally, the operations of method 700 may initialize a machine learning mechanism to: perform an analysis on the transaction elements, transaction opportunities, transaction criteria, transaction objections, and historical data; learn one or more alternative entity transaction opportunities, required transaction elements to be including in a future/subsequent communication for securing a subsequent transaction opportunity, or a combination there; learn a plurality of decisions relating to correcting each communication message relating to the transaction elements, and/or recommend a series of corrective actions to de-escalate a possible negative impact or increase a possible positive impact of one or more communications, behavior, actions or events for securing the subsequent transaction opportunity.

The operations of method 700 may process the communications using natural language processing (NLP); convert an image or video data of the communications to text data; and/or convert audio data of the communications to text data. A machine learning mechanism may be initialized and use feedback information to learn decision elements of communication and learn/identify one or more persons communicating the transaction elements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for entity transaction interaction analysis and summarization by a processor, comprising:
   receiving data from one or more communications;
   executing machine learning logic to generate one or more transaction models to identify and extract transaction elements relating to one or more entity transaction interactions from the one or more communications by training the one or more transaction models to classify content of the one or more communications by performing one or more preprocessing, data cleaning, and classification operations on the one or more communications to produce a formatted transcript output, wherein at least some of the transaction elements include transcriptions of communication dialogs between a plurality of individuals in the course of engaging in one or more transaction opportunities;
   executing the machine learning logic to correlate those of the transaction elements leading to successful portions of the one or more transaction opportunities, and those of the transaction elements leading to unsuccessful portions of the one or more transaction opportunities, wherein the correlating includes analyzing arguments, associated with a competitor to an entity providing the one or more transaction opportunities, to identify which of the arguments produced the successful portions of the one or more transaction opportunities;
   combining the transaction elements with the one or more transaction opportunities and transaction historical data to provide a transaction summary indicative of the correlations;
   receiving feedback data associated with the transaction summary; and
   executing the machine learning logic to retrain the one or more transaction models using the feedback data to enable receiving a broader input set of subsequent input data of subsequent one or more communications to be analyzed by the retrained one or more transaction models.

2. The method of claim 1, further including defining the transaction elements as transaction goals, transaction criteria, transaction consensus or dissensions, alternative entity transaction opportunities.

3. The method of claim 1, further including linking together each of the transaction elements with identified sources of the transaction elements in the one or more communications.

4. The method of claim 1, further including identifying a consensus or dissension to the transaction elements by one or more users involved in the one or more communications.

5. The method of claim 1, further including:
recommending a potential transaction opportunity according to a ranking of criteria of the transaction elements, the one or more transaction opportunities, the transaction historical data, or a combination thereof; or
recommending one or more actions items required for execution to obtain the one or more transaction opportunities.

6. The method of claim 1, further including providing the transaction summary via an interactive graphical user interface (GUI) on one or more Internet of Things (IoT) devices.

7. A system for automated entity transaction interaction analysis and summarization, comprising:
one or more computers with executable instructions that when executed cause the system to:
receive data from one or more communications;
execute machine learning logic to generate one or more transaction models to identify and extract transaction elements relating to one or more entity transaction interactions from the one or more communications by training the one or more transaction models to classify content of the one or more communications by performing one or more preprocessing, data cleaning, and classification operations on the one or more communications to produce a formatted transcript output, wherein at least some of the transaction elements include transcriptions of communication dialogs between a plurality of individuals in the course of engaging in one or more transaction opportunities;
execute the machine learning logic to correlate those of the transaction elements leading to successful portions of the one or more transaction opportunities, and those of the transaction elements leading to unsuccessful portions of the one or more transaction opportunities, wherein the correlating includes analyzing arguments, associated with a competitor to an entity providing the one or more transaction opportunities, to identify which of the arguments produced the successful portions of the one or more transaction opportunities;
combine the transaction elements with the one or more transaction opportunities and transaction historical data to provide a transaction summary indicative of the correlations;
receive feedback data associated with the transaction summary; and
execute the machine learning logic to retrain the one or more transaction models using the feedback data to enable receiving a broader input set of subsequent input data of subsequent one or more communications to be analyzed by the retrained one or more transaction models.

8. The system of claim 7, wherein the executable instructions further define the transaction elements as transaction goals, transaction criteria, transaction consensus or dissensions, alternative entity transaction opportunities.

9. The system of claim 7, wherein the executable instructions further link together each of the transaction elements with identified sources of the transaction elements in the one or more communications.

10. The system of claim 7, wherein the executable instructions further identify a consensus or dissension to the transaction elements by one or more users involved in the one or more communications.

11. The system of claim 7, wherein the executable instructions further:
recommend a potential transaction opportunity according to a ranking of criteria of the transaction elements, the transaction opportunities, the transaction historical data, or a combination thereof; or
recommend one or more actions items required for execution to obtain the one or more transaction opportunities.

12. The system of claim 7, wherein the executable instructions further provide the transaction summary via an interactive graphical user interface (GUI) on one or more Internet of Things (IoT) devices.

13. A computer program product for automated entity transaction interaction analysis and summarization by a processor, the computer program product comprising a non-transitory computer-readable storage medium having computer-readable program code portions stored therein, the computer-readable program code portions comprising:
an executable portion that receives data from one or more communications;
an executable portion that executes machine learning logic to generate one or more transaction models to identify and extract transaction elements relating to one or more entity transaction interactions from the one or more communications by training the one or more transaction models to classify content of the one or more communications by performing one or more preprocessing, data cleaning, and classification operations on the one or more communications to produce a formatted transcript output, wherein at least some of the transaction elements include transcriptions of communication dialogs between a plurality of individuals in the course of engaging in one or more transaction opportunities;
an executable portion that executes the machine learning logic to correlate those of the transaction elements leading to successful portions of the one or more transaction opportunities, and those of the transaction elements leading to unsuccessful portions of the one or more transaction opportunities, wherein the correlating includes analyzing arguments, associated with a competitor to an entity providing the one or more transaction opportunities, to identify which of the arguments produced the successful portions of the one or more transaction opportunities;
an executable portion that combines the transaction elements with the one or more transaction opportunities and transaction historical data to provide a transaction summary indicative of the correlations;
an executable portion that receives feedback data associated with the transaction summary; and
an executable portion that executes the machine learning logic to retrain the one or more transaction models using the feedback data to enable receiving a broader input set of subsequent input data of subsequent one or more communications to be analyzed by the retrained one or more transaction models.

14. The computer program product of claim 13, further including an executable portion that:
defines the transaction elements as transaction goals, transaction criteria, transaction consensus or dissensions, alternative entity transaction opportunities; and
links together each of the transaction elements with identified sources of the transaction elements in the one or more communications.

15. The computer program product of claim 13, further including an executable portion that identifies a consensus or dissension to the transaction elements by one or more users involved in the one or more communications.

16. The computer program product of claim 13, further including an executable portion that:
   recommends a potential transaction opportunity according to a ranking of criteria of the transaction elements, the transaction opportunities, the transaction historical data, or a combination thereof; or
   recommends one or more actions items required for execution to obtain one or more of the transaction opportunities.

17. The computer program product of claim 13, further including an executable portion that provides the transaction summary via an interactive graphical user interface (GUI) on one or more Internet of Things (IoT) devices.

* * * * *